July 24, 1956     LE ROY H. BARR     2,755,817

BALANCED PRESSURE RELIEF VALVE

Filed March 23, 1951

INVENTOR.
LeRoy H. Barr
BY
Leonard S. [Signature]
Attorney

United States Patent Office 2,755,817
Patented July 24, 1956

2,755,817

BALANCED PRESSURE RELIEF VALVE

Le Roy H. Barr, Elyria, Ohio, assignor to Lear, Incorporated, Grand Rapids, Mich.

Application March 23, 1951, Serial No. 217,250

2 Claims. (Cl. 137—536)

This invention relates to a by-pass type of pressure relief valve for fluids. More specifically it has relation to a balanced valve in which fluctuations in the supply pressure existing on one side of the valve are incapable of effecting operation of the valve in response to a preset pressure at which relief is to occur, and as exerted on the discharge side of the valve.

In many pump applications a constant discharge pressure is required, for example, in supplying water to vending units for dispensing beverages, such as soda pop, by the glass, and in which carbonation of the city water is effected within the machine. In such machines the adjustments required to cause dispensing of a measured quantity of charged water are somewhat critical, inasmuch as the paper cups employed are limited in content and the proportion of syrup to water must be closely maintained. It has also been found that fluctuations in the pressure of water fed to the machine are easily responsible for malfunctioning of the equipment, particularly the carbonator. Accordingly there has arisen a demand for a pump to provide water under pressure to the dispensing part of the apparatus which will maintain a constant pressure at its discharge side.

As part of the function last noted, means must be provided for relieving any excessive discharge pressure by bypassing the water to the inlet side of the pump, but which means must also be independent of fluctuations of pressure on the inlet side, having in mind that usual supply sources, e. g. a city water main, exhibit such variations to an appreciable degree.

By reason of the foregoing, this invention has for its principal object provision of a relief valve which will bypass fluid from the outlet side to the inlet side of the pump with which the valve is associated, and will function uniformly regardless of variations in the pressure of the supply source.

Another object is to provide a valve as aforesaid which shall comprise a minimum number of parts, be capable of being incorporated in the body of the pump in a minimum of space, employ only one spring for operating bias, be positive and reliable, and uniform in its response over an extended period.

In the drawing which illustrates one mode of carrying the invention into practice:

Figure 1:
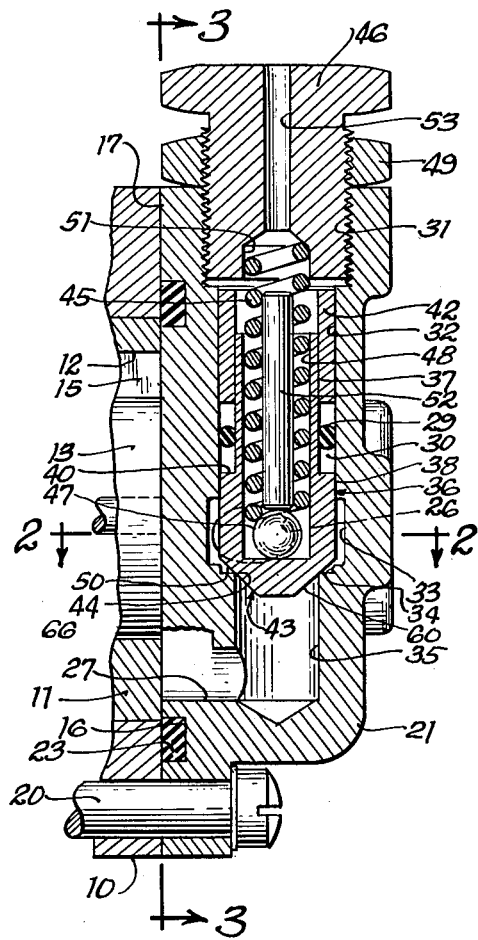
Fig. 1 shows a cross-sectional view of the valve in a typical environment, namely associated with the body of a pump.
Figure 2:
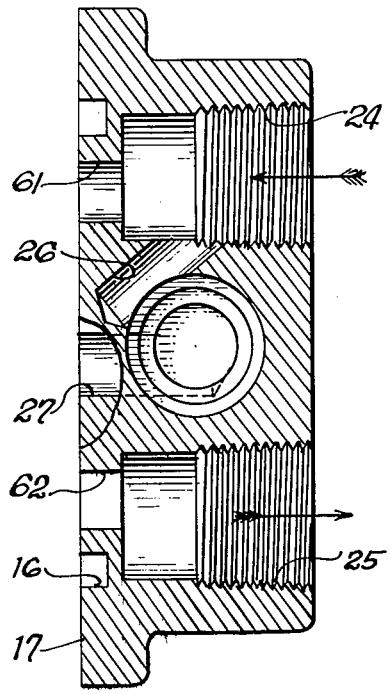
Fig. 2 is a cross section taken on the line 2—2 of Fig. 1.

Regarded broadly, the invention valve contemplates the employment of a piston slidable in a cylinder formed in the pump body and having a face arranged to close against a seat. Communication between each side of the valve and the inlet and discharge of the pump is provided by suitable porting. A spring is utilized to bias the piston against its seat, and novel means are associated with the spring to insure a constant, pre-set pressure thereof. The piston and the chambers cooperative therewith are so constructed and arranged that the piston is fully balanced as to inlet pressure and may be disturbed only by pressure exceeding a set maximum subsisting at the discharge, i. e. variations in the inlet pressure are ineffective to exert axial force against the piston in either direction.

Referring to the drawing the invention is illustrated by way of example as incorporated with a rotary vane pump of the positive displacement type, although the invention is capable of being fabricated as a separate unit, and connected by suitable piping to the pump and the supply and discharge lines.

A pump body or casing 10 carries a pump liner 11 defining a substantially cylindrical bore 12, and within which latter a rotor 13 is eccentrically supported for rotation. Vanes 15 are carried in slots in the rotor for radial slidable movement with respect thereto, whereby upon rotation of the rotor the vanes are enabled to sweep out varying volumes within the bore to displace fluid through the pump, and as is well known.

Secured to the casing 10 by screws 20 is a valve body 21 which not only serves as one end closure of the pump but supports and constitutes part of the relief valve of the invention. Packing 23 inserted in an annular groove 16, acts as a seal between the parts 10 and 21. Inlet and outlet ports for the pump are shown at 24 and 25 respectively, and are connected by piping (not shown) to a supply source and to the point to which the fluid is ultimately delivered. In fluid communication with the ports 24 and 25 is a pair of passages 26 and 27 respectively, and which will be elaborated upon hereinafter.

Valve body 21 is provided with a plurality of cojoined, coaxial cylindrical openings comprising a threaded opening 31, a cylinder 32, a cylindrical chamber 33, a cylindrical recess 34 in the floor of the chamber, and a port 35. Arranged for sliding movement in the cylinder 32 is a cylindrical piston 36 having guiding surfaces 37 and 38, the latter being juxtaposed to the wall of the cylinder 32. Surface 37, of reduced diameter, is slidable in a spacer or bushing 42 press-fitted into the cylinder 32, and defines, with the surface 38 an annular shoulder 40, which may or may not be in a plane normal to the piston axis. In order to seal the piston with respect to atmosphere, there is inserted intermediate the bushing 42 and guide portion 38 of the piston, a rubber O ring or equivalent 29.

At its lower end the valve 36 is provided with a frustoconical face 43 adapted to seat on the line 44 formed by the intersection of the wall of the port 35 with the floor of the recess 34. For convenience of description that portion of the face 43 disposed above the line 44 will be referred to hereinafter by the numeral 50, and that part below by the numeral 60. It will be understood that, insofar as fluid pressure in an axial sense is concerned, the actual configuration of the face 43 is unimportant, e. g. such face may be a spherical zone.

Inasmuch as the piston 36 is insensitive to inlet pressure it is necessary to bias the same against the normal discharge pressure. For providing such bias a compression spring 45 is lodged within a cavity 48 in the piston 36, and is arranged to abut a spring-adjusting screw 46 at its upper end and a ball 47 at its lower end, this latter in turn resting on the flat floor of the cavity 48. Screw 46 is threadedly engaged in the opening 31, and is locked in a pre-selected position by a jam nut 49. Not only is the spring 45 guided exteriorly by the wall of the cavity 48 and by a counterbore 51 in the nut 46, but interiorly by a pin 52. Thus any tendency of the spring to buckle is effectively counteracted, and the spring load maintained highly uniform under deflection. By providing a flat surface normal to the piston axis on which the ball 47 may rest this latter may take a lateral position governed by the configuration of the lower end of the spring as contrasted with a construction in which a drilled hole of the usual character, and in which the centering of the ball in the conical bottom thereof will tend to distort the spring laterally, and with possible binding thereof. Additionally the ball 47 eliminates any change in the spring force, due to rotation of the spring on its axis under repeated deformation, by acting as a centralizing seat for the circular end face of the spring. The upper face of the piston 36 is maintained at atmospheric pressure by means of a vent 53 drilled through the screw 46.

Figure 3:
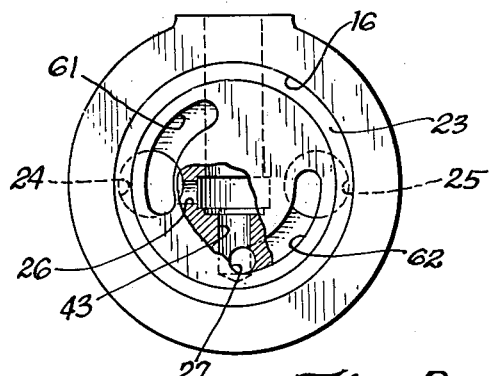
Fig. 3 is a cross-sectional view taken on the line 3—3 of Fig. 1.

At this juncture it is pointed out that the passage 26 heretofore mentioned opens into the chamber 33, and that the passage 27 opens into the port 35. Referring particularly to Fig. 3 there is provided on the inner face 17 of the body part 21 a pair of arcuate recesses 61 and 62. The depth of the recess 61 is such as to cause the same to intersect the inlet port 24 and thus to provide fluid connection from the source to that zone of the pump rotor, vanes and bore at which intake is effected, the arcuate recess 61 being so dimensioned as to deliver fluid at the proper rate and in the proper position. The other recess 62 functions similarly, and is seen to be in communication with the outlet port 25 at its upper end, and is arranged so as to be coextensive with that zone of the rotor, vanes and bore whereat discharge of fluid is effected. At its lower end the recess 62 is in communication with the passage 27.

The diameter of the reduced portion 37 of the piston 36 is equal to the diameter of the port 35. Moreover the fit between the portion 38 of the piston and the bore 32 is such as to permit fluid to enter the space 30 intermediate the O ring 29 and the annular shoulder 40 of the piston. Such space will therefore hold fluid at inlet pressure by virtue of the passage 26 interconnecting the inlet port 24 with the chamber 33. Additionally the axially projected area 50 of the frusto-conical face 43, lying above the seating line 44, is subjected to the same inlet pressure. Thus, since the areas 40 and 50 are of the same effective area in a transverse sense the piston, in the absence of additionally applied pressure, will not be subject to movement in an axial direction, and is therefore balanced as to inlet pressure.

Accordingly should the discharge pressure of the pump exceed that for which the force of the spring 45 has been pre-adjusted, the piston 36 will be subjected to such excess discharge pressure on that portion 60 of the frusto-conical face 43 lying below the seating line 44, and the piston will be raised to vent liquid to the chamber 33, i. e. the inlet side of the pump.

From the foregoing it will have been comprehended that the relief valve is fully balanced with respect to the inlet pressure, so that variations therein are ineffective to alter the predetermined operating characteristics of the valve. Consequently the valve will be responsive only to variations in the outlet pressure, and will act to relieve any excess pressure.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A balanced valve for relieving excess pressure in a discharge line of a pump comprising a housing provided with a bore having an inlet and an outlet, said inlet providing a valve seat of reduced diameter, a piston slidably mounted in said bore and having an imperforate sealing face at one end for closing said seat, a spring urging said piston toward closing position, a flat surface on said piston, a ball inserted between one end of said spring and said flat surface for slight lateral movement on said surface, said piston having a reduced portion providing a shoulder beyond the outlet, means sealing said bore and piston beyond said shoulder, means providing a vent from the bore beyond the sealing means and remotely from the seat, said bore having an enlarged portion adjacent the outlet, the valve face having an annular portion extending beyond the seat of reduced diameter and exposed to outlet pressure in the enlarged bore portion, the said annular portion of the valve face and the shoulder being of equal effective areas, and means providing communication between the enlarged bore portion and said shoulder whereby said valve is balanced as to outlet pressure.

2. A balanced valve for relieving excess pressure in a discharge line of a pump comprising a housing provided with a bore having an inlet and an outlet, said inlet providing a valve seat of reduced diameter, a piston slidably mounted in said bore and having an imperforate sealing face at one end for closing said seat, a spring urging said piston toward closing position, said piston having a reduced portion providing a shoulder beyond the outlet, means sealing said bore and piston beyond said shoulder, means providing a vent from the bore beyond the sealing means and remotely from the seat, said bore having an enlarged portion adjacent the outlet, the valve face having an annular portion extending beyond the seat of reduced diameter and exposed to outlet pressure in the enlarged bore portion, the said annular portion of the valve face and the shoulder being of equal effective areas, and means providing communication between the enlarged bore portion and said shoulder whereby said valve is balanced as to outlet pressure.

References Cited in the file of this patent

UNITED STATES PATENTS

| | | |
|---|---|---|
| 2,264,656 | Briscoe et al. | Dec. 2, 1941 |
| 2,299,079 | Davis | Oct. 20, 1942 |
| 2,307,949 | Phillips | Jan. 12, 1943 |
| 2,400,418 | Hofbauer | May 14, 1946 |
| 2,411,930 | Mathys | Dec. 3, 1946 |
| 2,628,635 | Stevenson | Feb. 17, 1953 |
| 2,630,292 | Skweir | Mar. 3, 1953 |

FOREIGN PATENTS

| | | |
|---|---|---|
| 8,680 | Great Britain | May 10, 1900 |